United States Patent
Suyama et al.

(10) Patent No.: US 11,027,616 B2
(45) Date of Patent: Jun. 8, 2021

(54) VEHICLE DRIVING DEVICE

(71) Applicant: AISIN AW CO., LTD., Anjo (JP)

(72) Inventors: Daiki Suyama, Okazaki (JP); Hiroaki Sanji, Takahama (JP); Mitsuhiro Ichioka, Nishio (JP); Yuki Kawaguchi, Gamagori (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

(21) Appl. No.: 16/645,176

(22) PCT Filed: Oct. 12, 2018

(86) PCT No.: PCT/JP2018/038207
§ 371 (c)(1),
(2) Date: Mar. 6, 2020

(87) PCT Pub. No.: WO2019/074120
PCT Pub. Date: Apr. 18, 2019

(65) Prior Publication Data
US 2021/0114467 A1    Apr. 22, 2021

(30) Foreign Application Priority Data

Oct. 13, 2017    (JP) .............................. JP2017-199761

(51) Int. Cl.
| *B60L 15/20* | (2006.01) |
| *F16H 1/46* | (2006.01) |
| *B60K 1/00* | (2006.01) |
| *F16H 57/037* | (2012.01) |
| *F16H 57/02* | (2012.01) |

(52) U.S. Cl.
CPC ................ *B60L 15/20* (2013.01); *B60K 1/00* (2013.01); *F16H 1/46* (2013.01); *F16H 57/037* (2013.01); *B60K 2001/001* (2013.01); *F16H 2057/02034* (2013.01); *F16H 2057/02052* (2013.01)

(58) Field of Classification Search
None
See application file for complete search history.

(56) References Cited

U.S. PATENT DOCUMENTS

| 6,059,684 A | 5/2000 | Sasaki et al. |
| 6,074,321 A | 6/2000 | Maeda et al. |

(Continued)

FOREIGN PATENT DOCUMENTS

| DE | 102014221123 A1 | 4/2016 |
| DE | 102015205264 A1 | 9/2016 |

(Continued)

OTHER PUBLICATIONS

Jan. 8, 2019 International Search Report issued in International Patent Application No. PCT/JP2018/038207.

(Continued)

*Primary Examiner* — Colby M Hansen
(74) *Attorney, Agent, or Firm* — Oliff PLC

(57) ABSTRACT

A vehicle driving device including: a rotary electric machine that is a driving force source of a first wheel and a second wheel; a speed reduction device that reduces a speed of a rotation of the rotary electric machine; and a differential gear device that distributes to the first wheel and the second wheel, a driving force that is transmitted from the rotary electric machine via the speed reduction device.

20 Claims, 6 Drawing Sheets

(56) References Cited

U.S. PATENT DOCUMENTS

| | | | |
|---|---|---|---|
| 2009/0308145 A1* | 12/2009 | Suzuki | B60L 50/61 73/114.04 |
| 2011/0111919 A1* | 5/2011 | Wenthen | B60K 17/046 477/2 |
| 2014/0126932 A1 | 5/2014 | Iijima | |
| 2018/0236861 A1* | 8/2018 | Jegebris | B60K 17/08 |

FOREIGN PATENT DOCUMENTS

| | | |
|---|---|---|
| DE | 102015218252 A1 | 3/2017 |
| JP | H09-89063 A | 3/1997 |
| JP | H10-287142 A | 10/1998 |
| JP | H11-166609 A | 6/1999 |
| JP | 2001-330085 A | 11/2001 |
| JP | 2001-330111 A | 11/2001 |
| JP | 4016804 B2 | 12/2007 |
| JP | 2014-95416 A | 5/2014 |
| JP | 2015-230052 A | 12/2015 |
| JP | 2017-158377 A | 9/2017 |

OTHER PUBLICATIONS

Aug. 21, 2020 Search Report issued in European Patent Application No. 18865637.5.

* cited by examiner

VEHICLE DRIVING DEVICE

BACKGROUND

The disclosure relates to a vehicle driving device provided with: a rotary electric machine that serves as a driving force source of a first wheel and a second wheel; a speed reduction device that reduces the speed of the rotation of the rotary electric machine; and a differential gear device that distributes to the first wheel and the second wheel, a drive force from the rotary electric machine that is transmitted via the speed reduction device.

An example of the vehicle driving device is disclosed in Japanese Unexamined Patent Application Publication No. 10-287142 (JP 10-287142 A). Hereinafter, symbols indicated with brackets in the description of the background art are the symbols that are used in JP 10-287142 A. A vehicle driving device according to JP 10-287142 A has a motor (M), a differential device (Gd), and a counter gear mechanism (Gc) that transmits the power of the motor (M) to the differential device (Gd). The counter gear mechanism (Gc) configures a speed reduction device that reduces the speed of the rotation of the motor (M) and transmits the rotation to the differential device (Gd). As illustrated in FIGS. 1 and 2 in JP 10-287142 A, the motor (M), the differential device (Gd), and the counter gear mechanism (Gc) are disposed separately on three different axes that are parallel to each other.

While taking the on-vehicle mountability of the vehicle driving device into consideration, it is preferable that the size of the entire device be reduced as much as possible. Regarding this point, in the vehicle driving device according to JP 10-287142 A, the three devices that are the rotary electric machine, the speed reduction device (the counter gear mechanism in JP 10-287142 A), and the differential gear device are disposed separately on three different axes that are parallel to each other. Thus, the size of entire device is likely to be increased in a radial direction. In order to decrease the size of the entire device in the radial direction, it is conceivable to dispose the three devices on the same axis. In this case however, the size of the entire device is likely to be increased in the axial direction.

SUMMARY

An exemplary aspect of the disclosure provides a vehicle driving device in which the size of the entire device in both the radial direction and the axial direction can be decreased.

In one aspect, in view of the above, a vehicle driving device includes: a rotary electric machine that is a driving force source of a first wheel and a second wheel; a speed reduction device that reduces a speed of a rotation of the rotary electric machine; and a differential gear device that distributes to the first wheel and the second wheel, a driving force that is transmitted from the rotary electric machine via the speed reduction device, in which the speed reduction device and the differential gear device are disposed coaxially with the rotary electric machine, the speed reduction device has a first planetary gear mechanism and a second planetary gear mechanism, the first planetary gear mechanism is disposed on a rotary electric machine side relative to the second planetary gear mechanism in an order of a power transmission path, and the first planetary gear mechanism is disposed on the rotary electric machine side relative to the second planetary gear mechanism along an axial direction, a helix angle of a helical tooth of the first planetary gear mechanism and a helix angle of a helical tooth of the second planetary gear mechanism are formed so that a thrust force of the first planetary gear mechanism and a thrust force of the second planetary gear mechanism are in mutually opposite directions in the axial direction, and the helix angle of the helical tooth of the first planetary gear mechanism is larger than the helix angle of the helical tooth of the second planetary gear mechanism.

In this configuration, the speed reduction device and the differential gear device are disposed coaxially with the rotary electric machine. Thus, compared to when the three devices are disposed separately on three axes parallel to each other, it is possible to suppress the size of the vehicle driving device in a radial direction to be small. Moreover, in this configuration, it is possible to decrease the size of the thrust bearing as described below. Thus, it is possible to suppress the size of the vehicle driving device from being large in the axial direction while disposing the three devices on the same axis.

Due to its structure, the helical gear generates a thrust force that is parallel to the rotational axis. When the directions of the thrust forces generated by the first planetary gear mechanism and the second planetary gear mechanism, which are both configured using a helical gear, are mutually opposite directions, it is possible to cause the thrust forces to cancel each other out. Typically, a thrust bearing is provided adjacent to the helical gear in the axial direction in order to receive a load by the thrust force from the helical gear in the axial direction. When the generated thrust force is large, the load applied to the thrust bearing becomes large, thus affecting the durability of the speed reduction device and the vehicle driving device. If the size of the thrust bearing is increased, downsizing of the vehicle driving device is hindered. With the configuration, it is possible to decrease the load applied to the thrust bearings by causing a part of the thrust forces of the two planetary gear mechanisms to cancel each other out. In addition, the size of the thrust bearing can be reduced so that the length of the vehicle driving device in the axial direction can be suppressed to be short.

The size of the thrust force is correlated to the transmission torque and the larger the transmission torque is, the larger the thrust force becomes. The second planetary gear mechanism is disposed on the output side of the speed reduction device relative to the first planetary gear mechanism in the order of the power transmission path. The driving force of the rotary electric machine after the speed thereof is reduced in the first planetary gear mechanism, is transmitted to the second planetary gear mechanism. Thus, the transmission torque is larger in the second planetary gear mechanism compared to the first planetary gear mechanism. The thrust force of the second planetary gear mechanism is therefore larger than the thrust force of the first planetary gear mechanism. The size of the thrust force is correlated to the helix angle of the helical tooth of the helical gear, and the larger the helix angle is, the larger the thrust force becomes. When a first helix angle that is a helix angle of the helical tooth of the first planetary gear mechanism is larger than a second helix angle that is a helix angle of the helical tooth of the second planetary gear mechanism, the proportion of the thrust force among forces output from the gear mechanism is larger in the first planetary gear mechanism than in the second planetary gear mechanism. That is, with the present configuration, it is possible to decrease the difference in the thrust force resulting from the difference in the transmission torque, with the helix angle of the helical tooth. This means that it is possible to decrease the load applied to the thrust bearings by causing the thrust forces of the two planetary gear mechanisms to cancel each other out. In addition, the size of the thrust bearing can be reduced so that the length of the vehicle driving device in the axial direction can be suppressed to be short.

In this way, with the configuration, it is possible to decrease the size of the entire vehicle driving device in both the radial direction and the axial direction.

Further features and advantages of the vehicle driving device will be apparent from the following description of embodiments which is given with reference to the accompanying drawings.

DETAILED DESCRIPTION OF EMBODIMENTS

Figure 1:
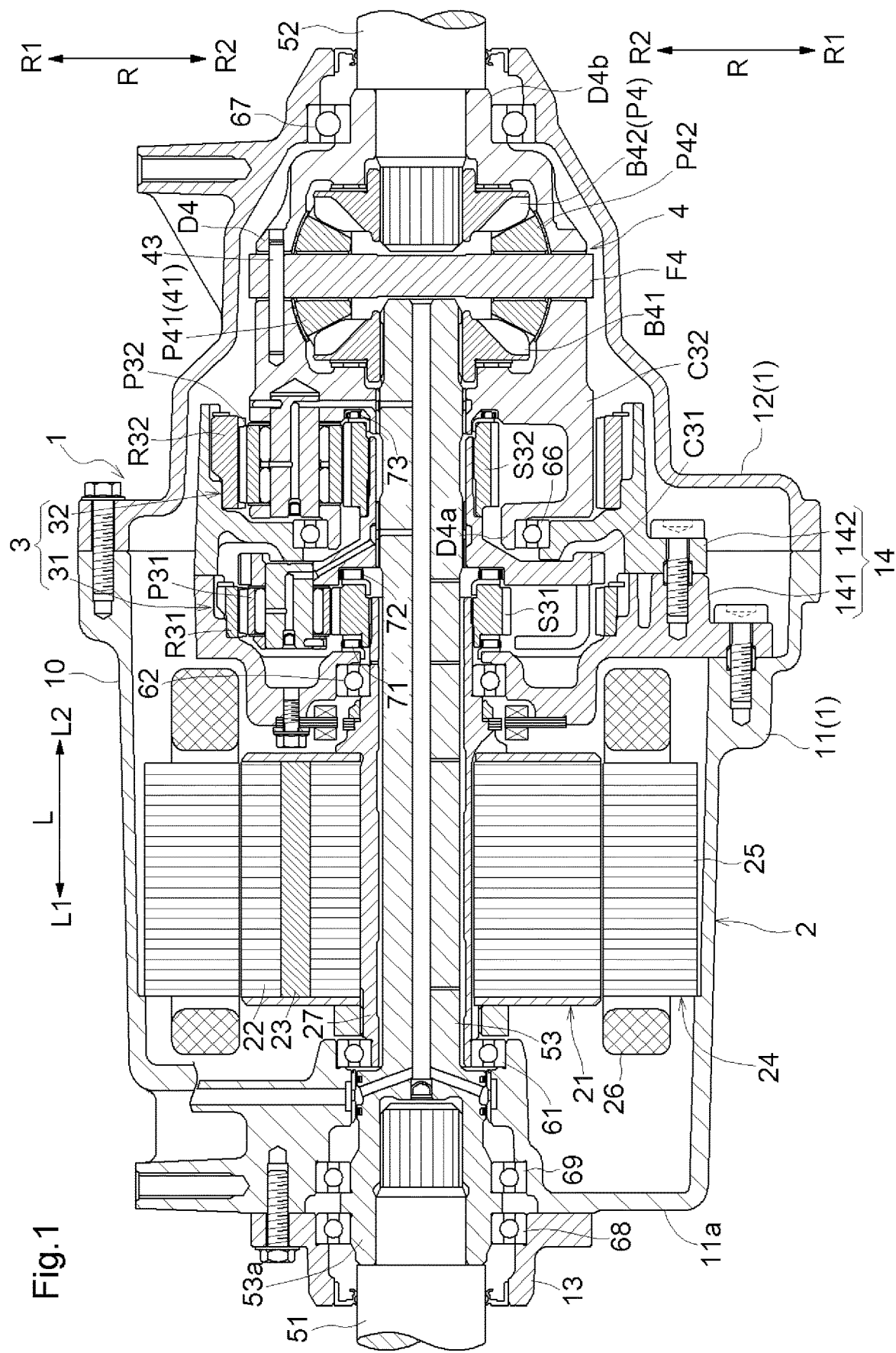
FIG. 1 is an axial sectional view of a vehicle driving device.
Figure 2:
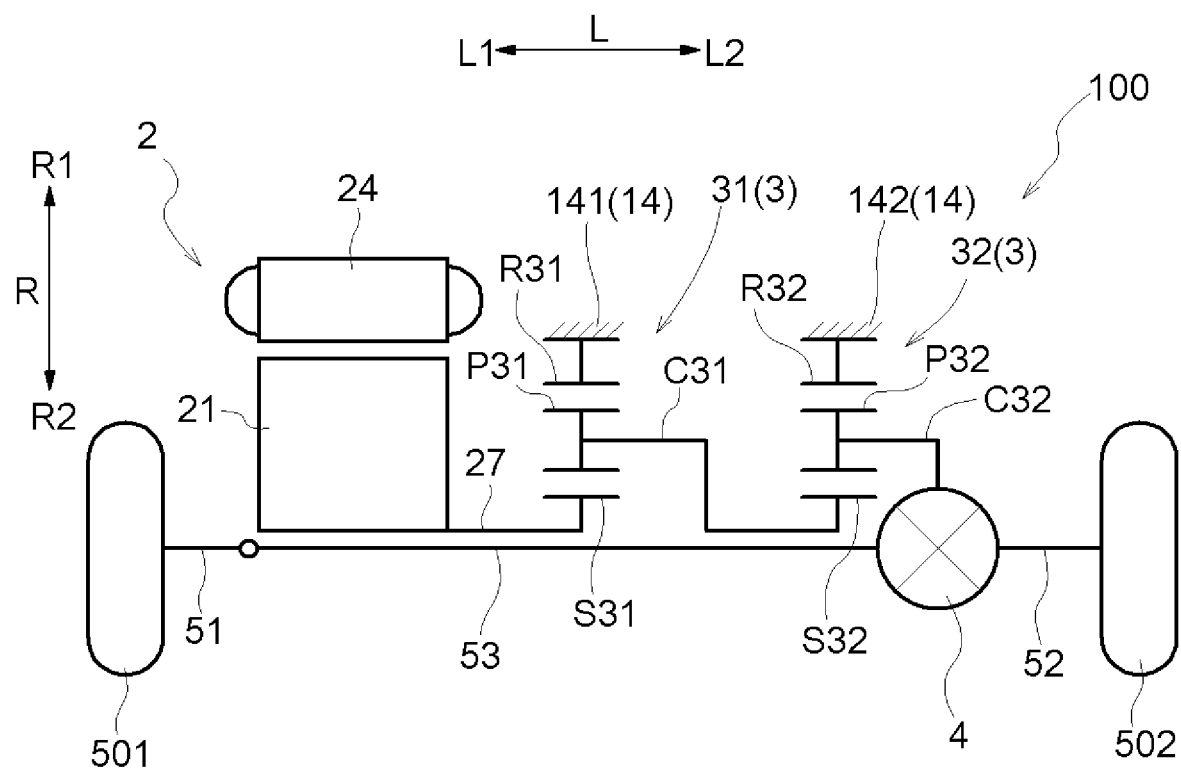
FIG. 2 is a skeleton view of the vehicle driving device.

An embodiment of a vehicle driving device will be described based on the drawings. FIG. 1 is an axial sectional view of a vehicle driving device 100. FIG. 2 is a skeleton view of the vehicle driving device 100. The vehicle driving device 100 is a vehicle driving device that is installed in a hybrid vehicle having an internal combustion engine and a rotary electric machine serving as a driving force source of a first wheel 501 and a second wheel 502, or an electric vehicle having a rotary electric machine serving as a driving force source of the first wheel 501 and the second wheel 502. As illustrated in FIGS. 1 and 2, the vehicle driving device 100 only has a rotary electric machine 2 serving as a driving force source of the first wheel 501 and the second wheel 502. In a case of a four-wheel vehicle with a two-wheel drive, an electric vehicle can thus be realized. In a case of a four-wheel vehicle with a four-wheel drive, a hybrid vehicle can be realized by driving the other two wheels with a driving force of an internal combustion engine. As a matter of course, in the case of a four-wheel vehicle with a four-wheel drive, an electric vehicle with a four-wheel drive can be realized by applying the vehicle driving device 100 of the embodiment to the other two wheels as well.

In the following description, the term "drivingly coupled" refers to a state in which two rotary elements are coupled to each other in such a manner that allows transmission of a driving force, including a state in which the two rotary elements are coupled to each other, and a state in which the two rotary elements are coupled to each other via one or two or more transmitting members in such a manner than allow transmission of a driving force. Such transmitting members include various members that transmit rotation at the same speed or a shifted speed and include a shaft, a gear mechanism, a belt, a chain, etc. Such transmitting members may include an engagement device that selectively transmits rotation and a driving force, such as, a friction engagement device and a meshing engagement device. When the expression "drivingly coupled" is used for each rotary element of a speed reduction device 3 and a differential gear device 4 described below, this refers to the state where the three or more rotary elements of the devices are drivingly coupled to each other without via other rotary elements.

In the following description, the expressions "tubular shape" and "cylindrical shape" mean that the overall general shape is a tube or a cylinder even when there are some deformed parts. Not limited to this, the same applies to other expressions related to shapes that are used by applying the term "shape".

As illustrated in FIGS. 1 and 2, the vehicle driving device 100 is provided with a case 1, the rotary electric machine 2 that has a rotor shaft 27 for outputting a driving force, the speed reduction device 3 including a planetary gear mechanism, and the differential gear device 4. The speed reduction device 3 reduces the speed of a rotation of the rotary electric machine 2 and transmits a driving force to the differential gear device 4. The differential gear device 4 distributes the driving force from the rotary electric machine 2 to a first drive shaft 51 and a second drive shaft 52. In the embodiment, the first drive shaft 51 is drivingly coupled to a distribution output shaft 53. The differential gear device 4 distributes the driving force to the second drive shaft 52 and the distribution output shaft 53 and the distributed driving force is transmitted to the first drive shaft 51 via the distribution output shaft 53.

In the vehicle driving device 100 of the embodiment, the rotary electric machine 2 the speed reduction device 3, the differential gear device 4, the first drive shaft 51, the second drive shaft 52, and the distribution output shaft 53 are coaxially disposed with reference to a rotor shaft 27 of the rotary electric machine 2. A direction along the rotor shaft 27 of the rotary electric machine 2 is equal to a direction along a rotational axis of the vehicle driving device 100. A direction along a radius of the rotor shaft 27 of the rotary electric machine 2 is equal to a direction along a radius of the vehicle driving device 100. In the embodiment, the direction along the rotor shaft 27 of the rotary electric machine 2 is referred to as an axial direction L of the vehicle driving device 100. The direction along the radius of the rotor shaft 27 of the rotary electric machine 2 is referred to as a radial direction R of the vehicle driving device 100. In the axial direction L, a side in which the rotary electric machine 2 is disposed relative to the speed reduction device 3 is referred to as an axial first side L1 and a side in which the differential gear device 4 is disposed relative to the speed reduction device 3 is referred to as an axial second side L2. In the radial direction R, an outer side on the opposite of the rotor shaft 27 is referred to as a radial outer side R1 and an inner side of the rotor shaft 27 side is referred to as a radial inner side R2.

In the vehicle driving device 100 of the embodiment, the rotary electric machine 2, the speed reduction device 3, and the differential gear device 4 are disposed so as to be arranged in this order that is the order of a power transmission path. As described below, the speed reduction device 3 has a first planetary gear mechanism 31 and a second planetary gear mechanism 32. With this in consideration, the rotary electric machine 2, the first planetary gear mechanism 31, the second planetary gear mechanism 32, and the differential gear device 4 are disposed so as to be arranged in this order that is the order of the power transmission path. The rotary electric machine 2, the speed reduction device 3 (the first planetary gear mechanism 31 and the second planetary gear mechanism 32), and the differential gear device 4 are disposed along the axial direction L so as to be arranged in the order of the rotary electric machine 2, the first planetary gear mechanism 31, the second planetary gear mechanism 32, and the differential gear device 4. That is, in either the order of the power transmission path or the order of disposition along the axial direction L, the first planetary gear mechanism 31 is disposed on the rotary electric machine 2 side relative to the second planetary gear mechanism 32.

The case 1 houses the rotary electric machine 2, the speed reduction device 3, and the differential gear device 4 inside. In the embodiment, the case 1 also houses a part of the first drive shaft 51 (an end portion on the axial second side L2), a part of the second drive shaft 52 (an end portion on the axial first side L1), and the distribution output shaft 53 inside. The case 1 is formed so as to have a peripheral wall portion 10 having a tubular shape surrounding the rotary electric machine 2, the speed reduction device 3, and radial outer side R1 of the differential gear device 4. The case 1 has a case body 11 (first case portion), a body cover 12 (second case portion), and a bottom portion cover 13. The case body 11 is formed to have a bottomed tubular shape and have a bottom portion 11a on an end portion on the axial first side L1, and has an opening portion on the opposite side (axial second side L2) of the case body 11 from the bottom portion 11a. The body cover 12 is disposed so as to abut against the case body 11 on the axial first side L1 and cover the opening portion, and is formed to have a conical tubular shape in which the diameter is decreased toward the axial second side L2. The bottom portion cover 13 is disposed on the axial first side L1 of the bottom portion 11a of the case body 11 so as to cover the bottom portion 11a. The case body 11 and the body cover 12 are fixed to each other with a fixing member (in the embodiment, a bolt). Similarly, the case body 11 and the bottom portion cover 13 are fixed to each other with a fixing member (in the embodiment, a bolt).

The rotary electric machine 2 and a part (first planetary gear mechanism 31) of the speed reduction device 3 are disposed in the internal space of the case body 11. Another part (second planetary gear mechanism 32) of the speed reduction device 3, the differential gear device 4, and a part (the end portion on the axial first side L1) of the second drive shaft 52 are disposed in the internal space of the body cover 12. A part (an end portion on the axial second side L2) of the first drive shaft 51 is disposed in the internal space that is formed by the case body 11 and the bottom portion cover 13. The distribution output shaft 53 is disposed in the internal space that is formed by the case body 11, the body cover 12, and the bottom portion cover 13.

Figure 3:
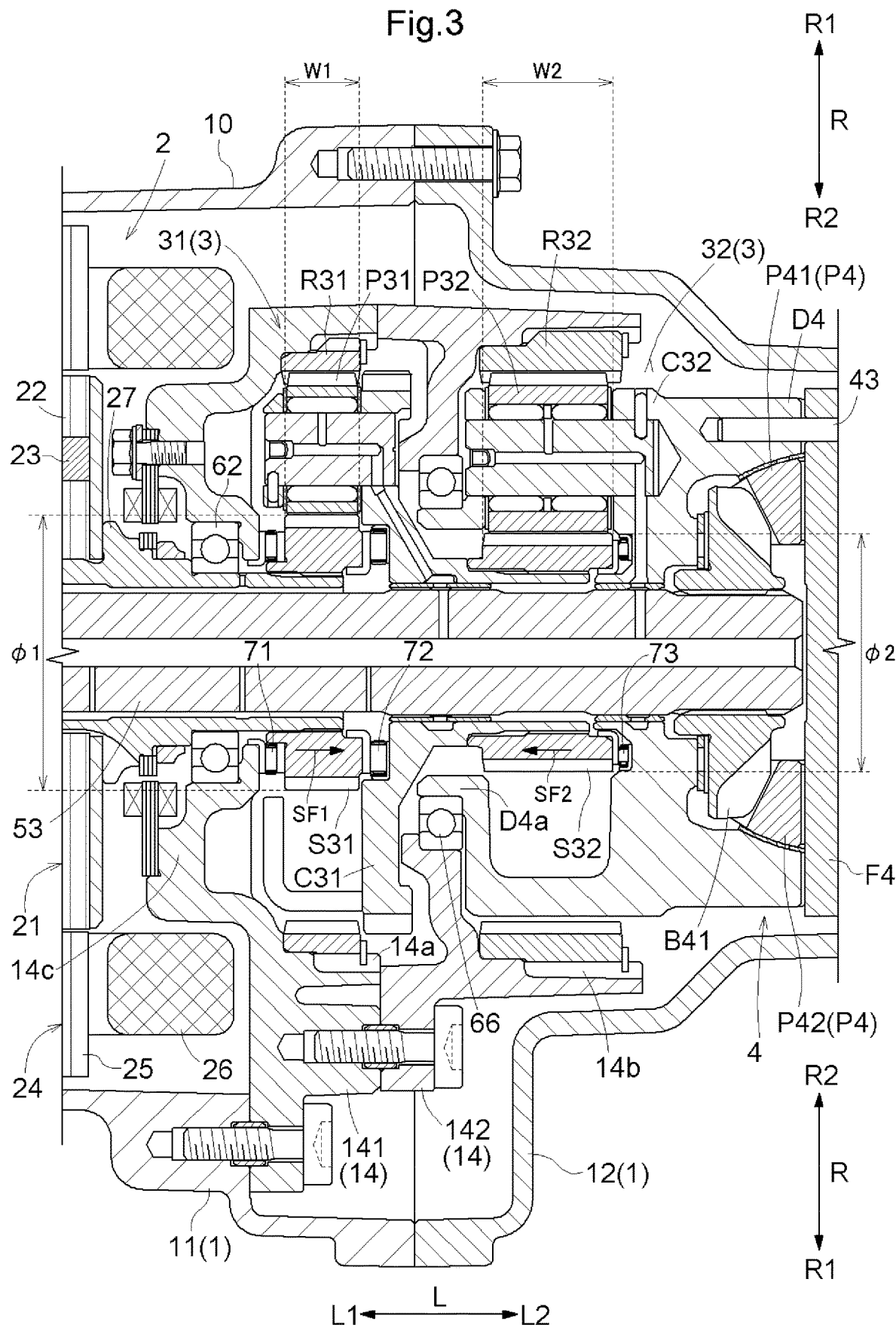
FIG. 3 is an axial sectional view of a speed reduction device.

As illustrated in FIG. 3, the case 1 has a support member 14. In the embodiment, the support member 14 includes a first support member 141 and a second support member 142. The first support member 141 is integrally fixed to the case body 11 and the second support member 142 is integrally fixed to the first support member 141. The first support member 141 is fixed to the peripheral wall portion 10 (here, a part of the peripheral wall portion 10 that is configured of the case body 11). That is, in the embodiment, the support member 14 is supported by the peripheral wall portion 10 of the case 1. A configuration in which the support member 14 is integrally formed with the peripheral wall portion 10 is also possible. The first support member 141 is formed between the rotary electric machine 2 and the speed reduction device 3 (first planetary gear mechanism 31) so as to extend along the radial direction R and a circumferential direction. In at least one part of the first support member 141 in the circumferential direction, the end portion of the first support member 141 on the radial outer side R1 and the case body 11 are fixed by a fixing member (in the embodiment, a bolt). The second support member 142 is formed between the first planetary gear mechanism 31 and the second planetary gear mechanism 32 so as to extend along the radial direction R and the circumferential direction. In at least one part of the second support member 142 in the circumferential direction, the end portion of the second support member 142 on the radial outer side R1 and the first support member 141 are fixed by a fixing member (in the embodiment, a bolt). The second support member 142 is integrally fixed to the first support member 141 on the axial second side L2 of the first support member 141.

The rotary electric machine 2 is a permanent magnet rotary electric machine that has a rotor 21 having a permanent magnet 23 in a rotor core 22, a stator 24 in which a stator coil 26 is wound around the stator core 25, and the rotor shaft 27 that is coupled to the rotor core 22. The stator 24 (specifically, the stator core 25) is fixed to the case 1, specifically to the peripheral wall portion 10 of the case 1. On the radial inner side R2 of the rotor core 22, the rotor shaft 27 is coupled to the rotor core 22 and the rotor 21 and the rotor shaft 27 rotate integrally. In the embodiment, the rotary electric machine 2 is a permanent magnet type rotary electric machine, but may be another type of rotary electric machine such as an induction type rotary electric machine.

The rotor shaft 27 is formed to have a cylindrical shape. A part of the rotor shaft 27 that protrudes to the axial first side L1 along the axial direction L more than the rotor core 22 is supported by the case body 11 of the case 1 via a first rotor bearing 61 so as to be rotatable. A part of the rotor shaft 27 that protrudes to the axial second side L2 along the axial direction L more than the rotor core 22 is supported by the first support member 141 of the support member 14 via a second rotor bearing 62 so as to be rotatable.

As described above, in the embodiment, the speed reduction device 3 includes the first planetary gear mechanism 31 and the second planetary gear mechanism 32. The first planetary gear mechanism 31 is a single-pinion type planetary gear mechanism that has a first sun gear S31, a first ring gear R31, a first carrier C31, and a plurality of first pinion gears P31. The first sun gear S31 is an input element of the first planetary gear mechanism 31 and is coupled so as to rotate integrally with the rotor shaft 27 of the rotary electric machine 2. The first ring gear R31 is a fixed element of the first planetary gear mechanism 31 and is supported by the first support member 141 so as not to rotate. That is, the first ring gear R31 is coupled to the first support member 141 (an example of the fixing member) so that the first ring gear R31 is stationary. The first carrier C31 is an output element of the first planetary gear mechanism 31 and is coupled to a second sun gear S32 of the second planetary gear mechanism 32 as described below. Thus, in the embodiment, the first sun gear S31 is a rotatable element that is rotatable and the first ring gear R31 is a fixed element that is stationary.

The first pinion gear P31 is disposed so as to mesh with the first sun gear S31 and the first ring gear R31, and is supported by the first carrier C31 so as to be rotatable. The first pinion gear P31 is configured to rotate (spin) around the shaft of the first pinion gear P31 and rotate (revolve) around the shaft of the first sun gear S31. Although not shown, a plurality of the first pinion gears P31 are provided along a revolution track of the first pinion gears P31 at intervals.

As described above, the second planetary gear mechanism 32 is disposed on the axial second side L2 relative to the first planetary gear mechanism 31 that is, the second planetary gear mechanism 32 is disposed on the opposite side of the first planetary gear mechanism 31 from the rotary electric machine 2 side. The second planetary gear mechanism 32 is a single-pinion type planetary gear mechanism that has a second sun gear S32, a second ring gear R32, a second carrier C32, and a plurality of second pinion gears P32.

The second sun gear S32 is an input element of the second planetary gear mechanism 32. As described above, the second sun gear S32 is coupled to the first carrier C31 that is an output element of the first planetary gear mechanism 31. In the embodiment, the second sun gear S32 is coupled to the first carrier C31 via spline engagement. That is, the embodiment shows a form in which the first planetary gear mechanism 31 and the second planetary gear mechanism 32 are formed independently of each other, and the first planetary gear mechanism 31 and the second planetary gear mechanism 32 are coupled via spline engagement. However, the form is not limited to the form in which the first carrier C31 and the second sun gear S32 are configured of different members, and the first carrier C31 and the second sun gear S32 may be configured of one component. For example, the first planetary gear mechanism 31 and the second planetary gear mechanism 32 may be configured integrally to form one speed reduction device 3. Even when the first carrier C31 and the second sun gear S32 are configured of different members, the two may be coupled by welding for example, instead of being limited to spline engagement.

As illustrated in FIGS. 1 and 2, the second drive shaft 52 is disposed adjacent to the differential gear device 4 in the axial direction L and there is the rotary electric machine 2 and the speed reduction device 3 between the first drive shaft 51 and the differential gear device 4 in the axial direction L. Thus, the first drive shaft 51 is coupled to the differential gear device 4 via the distribution output shaft 53 that passes through the rotary electric machine 2 and the speed reduction device 3. In the embodiment, the first carrier C31 and the second sun gear S32 that rotate integrally are supported via a sliding bearing such as a bush so as to be rotatable around the distribution output shaft 53.

The second ring gear R32 is a fixed element of the second planetary gear mechanism 32 and is supported by the second support member 142 so as not to rotate in the circumferential direction. That is, the second ring gear R32 is coupled to the second support member 142 (an example of the fixing member) so that the second ring gear R32 is stationary. The second carrier C32 is an output element of the second planetary gear mechanism 32. In the embodiment, the second carrier C32 is formed integrally with a differential case D4 of the differential gear device 4. In addition, the end portion of the second carrier C32 on the axial first side L1 is supported, between the first planetary gear mechanism 31 and the second planetary gear mechanism 32 of the speed reduction device 3, by the second support member 142 via a first differential case bearing 66 such that the second carrier C32 is rotatable. Thus, in the embodiment, the second sun gear S32 is a rotatable element that is rotatable and the second ring gear R32 is a fixed element that is stationary.

The second pinion gear P32 is disposed so as to mesh with the second sun gear S32 and the second ring gear R32, and is supported by the second carrier C32 so as to be rotatable. The second pinion gear P32 is configured to rotate (spin) around the shaft of the second pinion gear P32 and rotate (revolve) around the shaft of the second sun gear S32. Although not shown, a plurality of the second pinion gears P32 are provided along a revolution track of the second pinion gears P32 at intervals.

As illustrated in FIG. 3, the support member 14 (an example of the fixing member) has a first support portion 14a that supports the first ring gear R31 and a second support portion 14b that supports the second ring gear R32. In the embodiment, the first support portion 14a is formed on the first support member 141 provided in the support member 14 and the second support portion 14b is formed on the second support member 142 provided in the support member 14. The first ring gear R31 is supported by the first support portion 14a while being at least partially covered by the first support portion 14a from the outer peripheral side. The second ring gear R32 is supported by the second support portion 14b while being at least partially covered by the second support portion 14b from the outer peripheral side. Specifically, the first support portion 14a is coupled to the first ring gear R31 via spline-fitting from the radial outer side R1 to support the first ring gear R31 so that the first ring gear R31 is stationary in the circumferential direction. Here, the first support portion 14a is formed continuously over the entire circumferential region and is disposed so as to cover the first ring gear R31 over the entire circumferential region. The second support portion 14b is coupled to the second ring gear R32 via spline-fitting from the radial outer side R1 to support the second ring gear R32 so that the second ring gear R32 is stationary in the circumferential direction. Here, the second support portion 14b is formed continuously over the entire circumferential region and is disposed so as to cover the second ring gear R32 over the entire circumferential region.

The differential gear device 4 distributes to the first wheel 501 and the second wheel 502, the driving force that is transmitted from the rotary electric machine 2 via the speed reduction device 3. Specifically, the differential gear device 4 distributes to the first wheel 501 and the second wheel 502, the driving force that is transmitted from the rotary electric machine 2 via the speed reduction device 3, via the first drive shaft 51 that is drivingly coupled to the distribution output shaft 53 and the second drive shaft 52. In the embodiment, the differential gear device 4 has the differential case D4 serving as an input element, a pinion shaft F4 that is supported by the differential case D4 so as to rotate integrally with the differential case D4, a first differential pinion gear P41 and a second differential pinion gear P42 that are supported so as to be rotatable with respect to the pinion shaft F4, and a first side gear B41 and a second side gear B42 serving as distribution output elements. Here, the first differential pinion gear P41, the second differential pinion gear P42, the first side gear B41, and the second side gear B42 are all bevel gears. That is, the differential gear device 4 is a differential gear device provided with a bevel gear-type gear mechanism.

The differential case D4 is a hollow member and the pinion shaft F4, a pair of differential pinion gears P4 (the first differential pinion gear P41 and the second differential pinion gear P42), the first side gear B41, and the second side gear B42 are housed in the differential case D4. In the embodiment, the differential case D4 is formed integrally with the second carrier C32 of the second planetary gear mechanism 32 and the second carrier C32 is configured as a part of the differential case D4. Thus, the end portion of the second carrier C32 on the axial first side L1 functions as a first supported portion D4a of the differential case D4. The first supported portion D4a is disposed between the first planetary gear mechanism 31 and the second planetary gear mechanism 32 in the axial direction L. The first supported portion D4a is directly supported by the first differential case bearing 66 that is fixed to the case 1 via the support member 14. As described above, the first support member 141 is fixed integrally to the case body 11 and the first support member 141 and the second support member 142 are fixed integrally to each other. The first supported portion D4a is thus supported by the case body 11 via the first differential case bearing 66.

The differential case D4 has a second supported portion D4b positioned on the opposite side (the axial second side L2) of the first supported portion D4a in the axial direction L. Here, the second supported portion D4b is formed so as to protrude to the axial second side L2 along the axial direction L more than the second side gear B42. The second supported portion D4b is formed to have a cylindrical shape and to be coaxial with the first side gear B41 and the second side gear B42. The second supported portion D4b is directly supported by a second differential case bearing 67 that is fixed to the body cover 12 of the case 1. That is, the second supported portion D4b is supported by the body cover 12 of the case 1 via the second differential case bearing 67 so as to be rotatable.

The pinion shaft F4 is inserted in the pair of differential pinion gears P4 and supports the differential pinion gears P4 so that the differential pinion gears P4 are rotatable. The pinion shaft F4 is inserted in a through hole that is formed along the radial direction R of the differential case D4 and is locked to the differential case D4 with a locking member 43.

The differential pinion gears P4 are attached to the pinion shaft F4 while facing each other with an interval therebetween along the radial direction R. The differential pinion gears P4 are configured to rotate in the internal space of the differential case D4 about the pinion shaft F4 as the center.

The first side gear B41 and the second side gear B42 are rotary elements after distribution is performed in the differential gear device 4. The first side gear B41 and the second side gear B42 are provided so as to face each other while sandwiching the pinion shaft F4 with an interval therebetween along the axial direction L. The first side gear B41 and the second side gear B42 are configured to rotate in each circumferential direction in the internal space of the differential case D4. The first side gear B41 and the second side gear B42 are each meshed to the first differential pinion gear P41 and the second differential pinion gear P42. A spline is formed on an inner peripheral surface of the first side gear B41 to couple the first side gear B41 and the distribution output shaft 53. A spline is formed on an inner peripheral surface of the second side gear B42 to couple the second side gear B42 and the second drive shaft 52.

The distribution output shaft 53 is a member that transmits to the first drive shaft 51, a driving force that is from the rotary electric machine 2 and that is distributed by the differential gear device 4. The distribution output shaft 53 passes through the rotor shaft 27 of the rotary electric machine 2 on the radial inner side R2 in the axial direction L. A spline is formed on an outer peripheral surface of the end portion of the distribution output shaft 53 on the axial second side L2 to couple the distribution output shaft 53 to the first side gear B41 of the differential gear device 4. The spline on the outer peripheral surface of the end portion of the distribution output shaft 53 on the axial second side L2 and the spline on the inner peripheral surface of the first side gear B41 are engaged so that the distribution output shaft 53 and the first side gear B41 are coupled so as to rotate integrally. A coupling portion 53a to couple the first drive shaft 51 and the distribution output shaft 53 is formed on the end portion of the distribution output shaft 53 on the axial first side L1.

The coupling portion 53a extends from a part on the axial first side L1 relative to the rotary electric machine 2 in the internal space of the case body 11 into the internal space of the bottom portion cover 13. The coupling portion 53a is formed to have a cylindrical shape and to be coaxial with portions of the distribution output shaft 53 other than the coupling portion 53a. The coupling portion 53a has an outer diameter that is larger than parts of the distribution output shaft 53 other than the coupling portion 53a. The coupling portion 53a is supported by the bottom portion cover 13 of the case 1 via a first output bearing 68 so as to be rotatable and is supported by the bottom portion 11a of the case body 11 via a second output bearing 69 so as to be rotatable. A spline is formed on the inner peripheral surface of the coupling portion 53a on the axial second side L2 to couple the coupling portion 53a and the first drive shaft 51.

The first drive shaft 51 is drivingly coupled to the first wheel 501 and the second drive shaft 52 is drivingly coupled to the second wheel 502. In the embodiment, the coupling portion 53a is provided on the end portion of the distribution output shaft 53 on the axial first side L1 and the first drive shaft 51 and the coupling portion 53a of the distribution output shaft 53 are coupled by the spline. However, the configuration is not limited to this. For example, a flange yoke may be provided on the end portion of the distribution output shaft 53 on the axial first side L1 instead of the coupling portion 53a and the flange yoke and the first drive shaft 51 may be fastened by a bolt.

Hereinafter, the detailed configuration of the speed reduction device 3 having the first planetary gear mechanism 31 and the second planetary gear mechanism 32 will be described. As described above, in the first planetary gear mechanism 31, the first sun gear S31 that is the input element is drivingly coupled to the rotary electric machine 2 (specifically, the rotor shaft 27 of the rotary electric machine 2), the speed of the rotation of the rotary electric machine 2 is reduced at a first speed reduction ratio, and the driving force is output from the first carrier C31 that is the output element. In the second planetary gear mechanism 32, the second sun gear S32 that is the input element is drivingly coupled to the first carrier C31 of the first planetary gear mechanism 31, the speed of the rotation of the rotary electric machine 2 is further reduced at a second speed reduction ratio, and the driving force is output from the second carrier C32 that is the output element.

The second planetary gear mechanism 32 is disposed on the output side of the speed reduction device 3 relative to the first planetary gear mechanism 31 in the order of the power transmission path. The driving force of the rotary electric machine 2 after the speed thereof is reduced in the first planetary gear mechanism 31, is transmitted to the second planetary gear mechanism 32. Thus, the transmission torque is larger in the second planetary gear mechanism 32 compared to the first planetary gear mechanism 31. From the view point of mechanical strength, it is preferable that the larger the transmission torque be, the larger the gear width (face width) along the axial direction L be set. It is possible to configure the speed reduction device 3 having an appropriate structure compatible with the size of the torque by decreasing a first gear width W1 of the first planetary gear mechanism 31 with a relatively small transmission torque, compared to a second gear width W2 of the second planetary gear mechanism 32 with a relatively large transmission torque. Thus, it is possible to suppress the length of the speed reduction device 3 in the axial direction L to be small. The embodiment illustrates an example in which the first speed reduction ratio is larger than the second speed reduction ratio. However, regardless of the size relation of the first speed reduction ratio and the second speed reduction ratio, it is preferable that the first gear width W1 be smaller than the second gear width W2, as illustrated in FIG. 3 (and FIG. 5 described below).

It is preferable that the second gear width W2 be smaller than the length obtained by multiplying the first gear width W1 by the first speed reduction ratio. When the ratio of the first gear width W1 and the second gear width W2 are made proportional to the respective input torque, the second gear width W2 is the length obtained by multiplying the first gear width W1 by the first speed reduction ratio. Although the transmission torque of the second planetary gear mechanism 32 is larger than that of the first planetary gear mechanism 31, the rotational speed of the second planetary gear mechanism 32 is lower than that of the first planetary gear mechanism 31. That is, it is possible to ensure a necessary durability even if the second gear width W2 is smaller than the length obtained by multiplying the first gear width W1 by the first speed reduction ratio, since the rotational speed is low. When the second gear width W2 is smaller than the length obtained by multiplying the first gear width W1 by the first speed reduction ratio, it is possible to shorten the length of the second planetary gear mechanism 32 in the axial direction L, and therefore it is possible to shorten the length of the entire speed reduction device 3 in the axial direction L.

In the embodiment illustrated in FIGS. 1 and 3, the first speed reduction ratio that is the speed reduction ratio of the first planetary gear mechanism 31 is smaller than the second speed reduction ratio that is the speed reduction ratio of the second planetary gear mechanism 32. When the first speed reduction ratio is smaller than the second speed reduction ratio, the rotational speed that is input to the second planetary gear mechanism 32 is higher and the input torque to the second planetary gear mechanism 32 is lower, compared to when the first speed reduction ratio is equal to the second speed reduction ratio. Since the input torque is lower, the necessary mechanical strength of the second planetary gear mechanism 32 is decreased and the size of the second planetary gear mechanism 32 can be decreased. In many cases, a face width of the gear mechanism is increased in the axial direction L in order to improve the mechanical strength to be compatible with a large input torque. In this case, the gear widths (the first gear width W1 and the second gear width W2) of the first planetary gear mechanism 31 and the second planetary gear mechanism 32 in the axial direction L is increased, for example.

As described above, it is possible to decrease the second gear width W2 that is the gear width of the second planetary gear mechanism 32 by decreasing the input torque to the second planetary gear mechanism 32. Since the rotation speed is higher and the torque is lower in the first planetary gear mechanism 31 than the second planetary gear mechanism 32, the first gear width W1 that is the gear width of the first planetary gear mechanism 31 is not increased so much, even if the transmission torque is somewhat increased. That is, as a result of the relationship between the first speed reduction ratio and the second speed reduction ratio, the decrease amount of the second gear width W2 is larger than the increase amount of the first gear width W1. Thus, it is possible to decrease the length of the entire speed reduction device 3 in the axial direction L. In this way, it is possible to decrease the length of the speed reduction device 3 in the axial direction L by appropriately setting the gear ratio of the two planetary gear mechanisms (31, 32) provided in the speed reduction device 3.

In the embodiment illustrated in FIGS. 1 and 3, in order to realize the speed reduction device 3 in which the first speed reduction ratio is smaller than the second speed reduction ratio, the second sun gear radius $\varphi 2$ that is the radius of the second sun gear S32 is smaller than the first sun gear radius $\varphi 1$ that is the radius of the first sun gear S31. As described above, in the first planetary gear mechanism 31 and the second planetary gear mechanism 32, the ring gear is the fixed element, the sun gear is the input element, and the carrier is the output element. For example, if the ring gears have the same radius, the smaller the radius of the sun gear is, the larger the speed reduction ratio becomes. That is, even if the configuration of each gear such as the radius and the number of teeth is somewhat different, it is easier to increase the speed reduction ratio when the radius of the sun gear is small. As illustrated in FIG. 3, in the embodiment, a second sun gear radius $\varphi 2$ is smaller than a first sun gear radius $\varphi 1$. Thus, the speed reduction device 3 having the first speed reduction ratio that is smaller than the second speed reduction ratio is realized appropriately.

In the embodiment, the first planetary gear mechanism 31 and the second planetary gear mechanism 32 are configured using a helical gear that is suitable for being used at high speed rotation since the strength is higher and the gear noise is lower than a spur gear. However, due to its structure, the helical gear generates a thrust force that is a force in a direction along the rotational axis. Typically, a thrust bearing is provided in a gear unit using a helical gear, in order to receive a load that tends to move the gear unit using the helical gear in the axial direction. As illustrated in FIGS. 1 and 3, a first thrust bearing 71 is provided on the axial first side L1 of the first planetary gear mechanism 31, a second thrust bearing 72 is provided between the first planetary gear mechanism 31 and the second planetary gear mechanism 32 in the axial direction L, and a third thrust bearing 73 is provided on the axial second side L2 of the second planetary gear mechanism 32. In detail, the first thrust bearing 71 is provided on the axial first side L1 of the first sun gear S31. In the embodiment, as illustrated in FIG. 3, the support member 14 described above is supported by the peripheral wall portion 10 of the case 1 so that the support member 14 has a portion (target portion 14c or target) that is disposed on the opposite side of the first planetary gear mechanism 31 from the side on which the second planetary gear mechanism 32 is disposed in the axial direction L (that is, the axial first side L1 of the first planetary gear mechanism 31). Here, the target portion 14c provided in the case 1 is formed on the first support member 141 provided in the support member 14. The first thrust bearing 71 is disposed between the first sun gear S31 and the support member 14 (specifically, the target portion 14c) in the axial direction L. A configuration in which the target portion 14c is formed integrally with the peripheral wall portion 10 is also possible, such as a configuration in which the support member 14 is formed integrally with the peripheral wall portion 10. The second thrust bearing 72 is provided on the axial second side L2 of the first sun gear S31 and on the axial first side L1 of a coupling portion of the first carrier C31 and the second sun gear S32. The third thrust bearing 73 is provided on the axial second side L2 of the second sun gear S32. In the embodiment, the second thrust bearing 72 functions as a "transmitting member" that transmits the thrust forces of the first planetary gear mechanism 31 and the second planetary gear mechanism 32 that face each other. The "transmitting member" may be a washer. In the embodiment, the second sun gear S32 is coupled to the first carrier C31 via spline engagement, as described above. The thrust force is also transmitted in this path and the first carrier C31 or a member coupling the first carrier C31 and the second sun gear S32 also functions as the "transmitting member".

Figure 4:
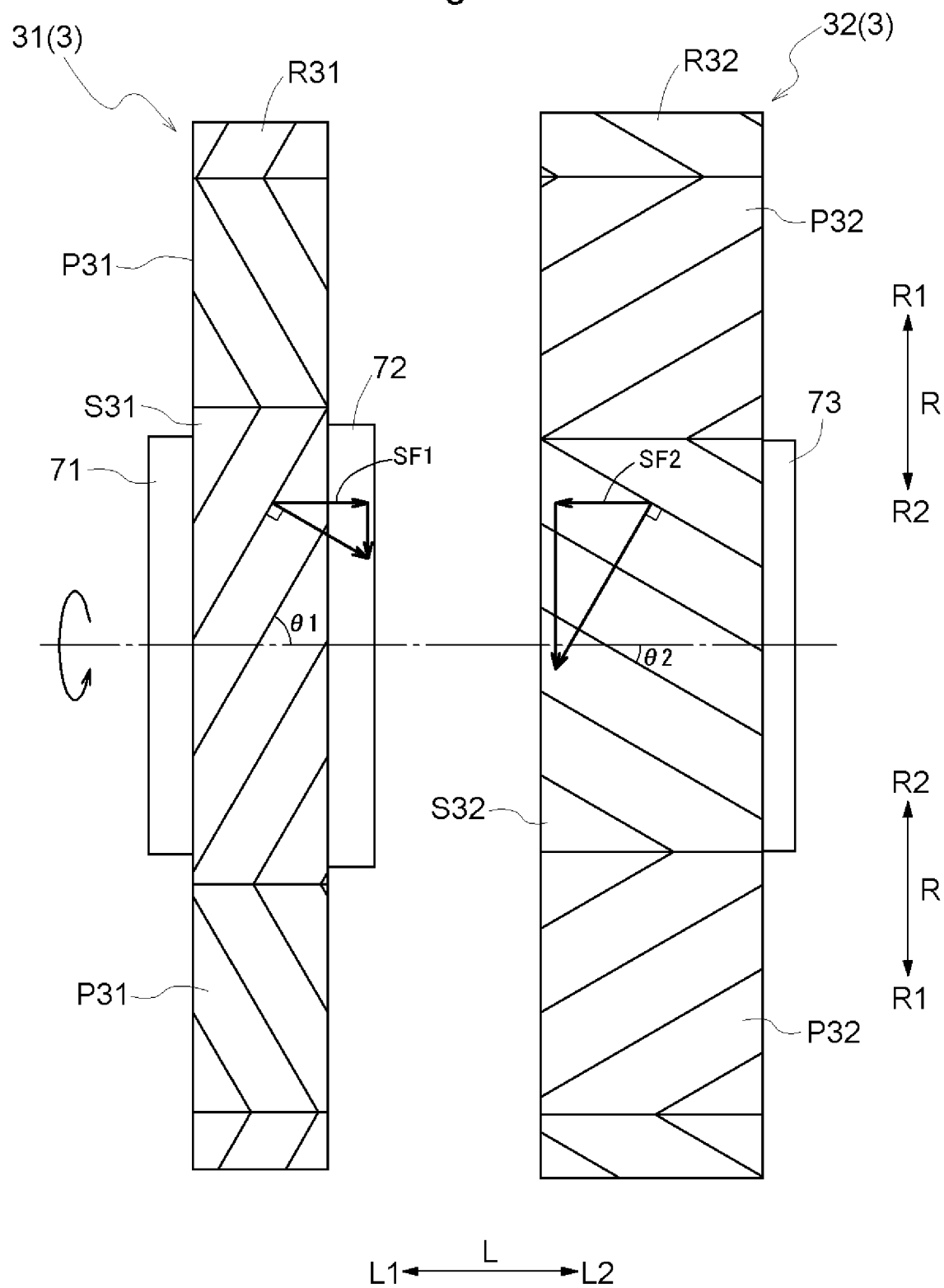
FIG. 4 is an explanatory diagram of a configuration of helical teeth of the speed reduction device and thrust forces.

FIG. 4 illustrates a configuration of helical teeth of the speed reduction device 3 and thrust forces. In the first planetary gear mechanism 31 and the second planetary gear mechanism 32, a helix angle of each helical tooth is formed so that a first thrust force SF1 that is a thrust force of the first planetary gear mechanism 31 and a second thrust force SF2 that is a thrust force of the second planetary gear mechanism 32 are in mutually opposite directions in the axial direction L. That is, a helix angle of a helical tooth of a rotatable element (in the embodiment, the first sun gear S31) of the first planetary gear mechanism 31 and a helix angle of a helical tooth of a rotatable element (in the embodiment, the second sun gear S32) of the second planetary gear mechanism 32 are formed so that they are in mutually opposite directions in the axial direction L. When the directions of the thrust forces (SF1, SF2) generated by the first planetary gear mechanism 31 and the second planetary gear mechanism 32, which are both configured using a helical gear, are in mutually opposite directions, it is possible to cause at least a part of the thrust forces (SF1, SF2) to cancel each other out. In the embodiment, the helix angles of the helical teeth are set so that when the driving force in a forward direction of the rotary electric machine 2 is transmitted to the first wheel 501 and the second wheel 502, the direction of the first thrust force SF1 generated in the first sun gear S31 and the direction of the second thrust force SF2 generated in the second sun gear S32 face each other. It is often that the direction in which the wheels (501, 502) are driven is the forward direction of the vehicle rather than the rearward direction of the vehicle. Thus, it is preferable that when the driving force in the forward direction of the rotary electric machine 2 is transmitted to the first wheel 501 and the second wheel 502, both thrust forces (SF1, SF2) face each other in the axial direction L. In this way, it is possible to decrease the load applied to the first thrust bearing 71 and the third thrust bearing 73 that are disposed on the outer side of the first sun gear S31 and the second sun gear S32 in the axial direction L.

Thus, in the embodiment, the helix angles of the helical teeth are set so that when the driving force in the forward direction of the rotary electric machine 2 is transmitted to the first wheel 501 and the second wheel 502, the direction of the first thrust force SF1 and the direction of the second thrust force SF2 face each other. However, the helix angles of the helical teeth may be set so that when a regenerative driving force (regenerative torque) of the rotary electric machine 2 is transmitted to the first wheel 501 and the second wheel 502, the direction of the first thrust force SF1 and the direction of the second thrust force SF2 face each other.

When the thrust force is large, the load applied to the thrust bearing becomes large, thus affecting the durability of the speed reduction device 3. However, if the size of the thrust bearing is increased, the length of the speed reduction device 3 in the axial direction L is increased, which hinders downsizing. It is possible to decrease the load applied to the first thrust bearing 71 and the third thrust bearing 73 by causing at least a part of the first thrust force SF1 generated in the first sun gear S31 and the second thrust force SF2 generated in the second sun gear S32 to cancel each other out. As a result, it is possible to ensure durability of the speed reduction device 3 even if the first thrust bearing 71 and the third thrust bearing 73 are small. That is, the thrust force that is generated in the planetary gear unit can be decreased and the length of the vehicle driving device 100 in the axial direction L can be shortened.

As illustrated in FIG. 4, when the force generated in a direction orthogonal to the helical tooth are decomposed into a vector component in a direction parallel to the rotational axis (here, coincides with the axial direction) and a vector component in a direction orthogonal to the rotational axis the thrust force corresponds to the vector component that is parallel to the rotational axis. That is, the larger the force generated in the direction orthogonal to the helical tooth is, the larger the thrust force becomes. Thus, the size of the thrust force is correlated to the transmission torque and the larger the transmission torque is, the larger the thrust force becomes.

The second planetary gear mechanism 32 is disposed on the output side of the speed reduction device 3 relative to the first planetary gear mechanism 31 in the order of the power transmission path. The driving force of the rotary electric machine 2 after the speed thereof is reduced in the first planetary gear mechanism 31, is transmitted to the second planetary gear mechanism 32. Thus, the transmission torque is larger in the second planetary gear mechanism 32 compared to the first planetary gear mechanism 31. Therefore, the second thrust force SF2 is larger than the first thrust force SF1.

The size of the thrust force is correlated to the helix angle of the helical tooth of the helical gear, and the larger the helix angle is, the larger the thrust force becomes. Here, the helix angle is an angle formed by the rotational axis of the helical gear and a tooth trace of the helical gear. When a force is generated in the direction orthogonal to the helical tooth, the larger the helix angle is, the larger the thrust force that is a component along the rotational axis becomes.

As illustrated in FIG. 4, when a first helix angle $\theta 1$ that is a helix angle of the helical tooth of the first planetary gear mechanism 31 is larger than a second helix angle $\theta 2$ that is a helix angle of the helical tooth of the second planetary gear mechanism 32, the proportion of the thrust force among forces output from the gear mechanism is larger in the first planetary gear mechanism 31 than in the second planetary gear mechanism 32. As described above, the thrust force in the second planetary gear mechanism 32 tends to be larger, since the transmission torque of the second planetary gear mechanism 32 is larger than the transmission torque of the first planetary gear mechanism 31. However, when the first helix angle $\theta 1$ is larger than the second helix angle $\theta 2$, it is possible to decrease the difference in the thrust force resulting from the difference in the transmission torque.

As described above, the second planetary gear mechanism 32 is disposed on the output side of the speed reduction device 3 relative to the first planetary gear mechanism 31 in the order of the power transmission path. Even when the speed reduction ratio (first speed reduction ratio) of the first planetary gear mechanism 31 and the speed reduction ratio (second speed reduction ratio) of the second planetary gear mechanism 32 are equal, the transmission torque of the second planetary gear mechanism 32, which is transmitted after the speed of the rotation is reduced by the first planetary gear mechanism 31, is larger than the transmission torque of the first planetary gear mechanism 31. Thus, even when the first speed reduction ratio and the second speed reduction ratio are equal, the second thrust force SF2 is larger than the first thrust force SF1. As illustrated in FIGS. 1 and 3, when the first speed reduction ratio is smaller than the second speed reduction ratio, the transmission torque of the second planetary gear mechanism 32 becomes larger than the transmission torque of the first planetary gear mechanism 31. The difference between the first thrust force SF1 and the second thrust force SF2 is larger than when the first speed reduction ratio and the second speed reduction ratio are equal. However, as described above, the difference between the first thrust force SF1 and the second thrust force SF2 can be decreased depending on the setting of the helix angles of the helical teeth.

Figure 5:
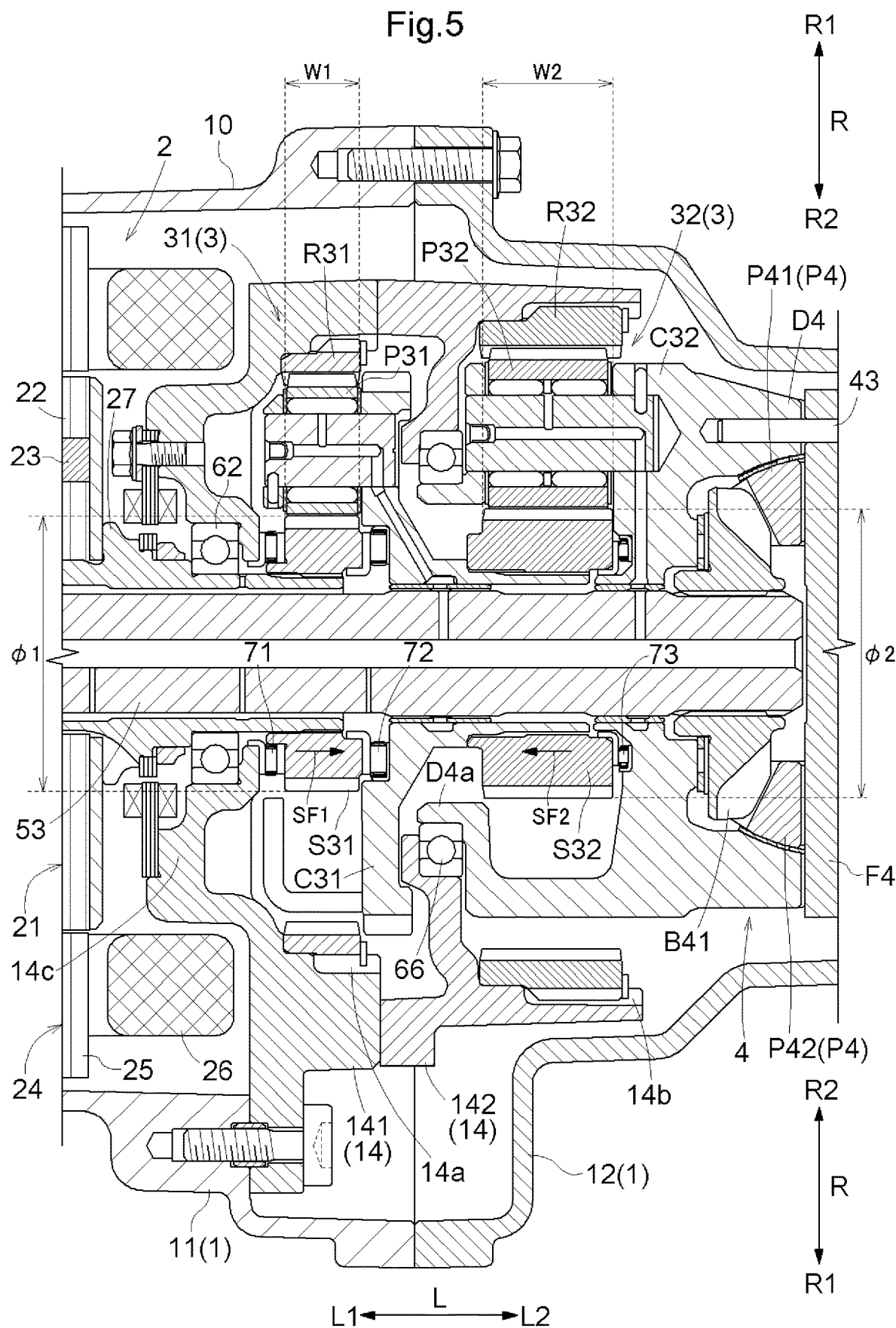
FIG. 5 is an axial sectional view of another configuration of the speed reduction device.

Unlike the embodiment illustrated in FIGS. 1 and 3, when the first speed reduction ratio is set to be larger than the second speed reduction ratio, the rotational speed input to the second planetary gear mechanism 32 is decreased and the input torque to the second planetary gear mechanism 32 is increased compared to when the first speed reduction ratio and the second speed reduction ratio are equal, while maintaining the speed reduction ratio of the entire speed reduction device 3, as illustrated in FIG. 5. That is, when the first speed reduction ratio is larger than the second speed reduction ratio, the transmission torque of the second planetary gear mechanism 32 that is relatively large becomes small and the transmission torque of the first planetary gear mechanism 31 that is relatively small becomes large.

This means that when the first speed reduction ratio is larger than the second speed reduction ratio, the first thrust force SF1 can be increased and the second thrust force SF2 can be decreased, compared to when the first speed reduction ratio and the second speed reduction ratio are equal. As a result, the relatively large second thrust force SF2 becomes small and the relatively small first thrust force SF1 becomes large. In this way, the difference between the first thrust force SF1 and the second thrust force SF2 is decreased, which allows a larger amount of the thrust forces to cancel each other out.

In the embodiment illustrated in FIG. 5, in order to realize the speed reduction device 3 in which the first speed reduction ratio is larger than the second speed reduction ratio, the second sun gear radius $\varphi 2$ that is the radius of the second sun gear S32 is larger than the first sun gear radius $\varphi 1$ that is the radius of the first sun gear S31. As described above, even if the configuration of each gear such as the radius and the number of teeth is somewhat different, it is easier to increase the speed reduction ratio when the radius of the sun gear is small, in the case where the ring gear is the fixed element, the sun gear is the input element, and the carrier is the output element. As illustrated in FIG. 5, when the second sun gear radius $\varphi 2$ is larger than the first sun gear radius $\varphi 1$, the speed reduction device 3 in which the first speed reduction ratio is larger than the second speed reduction ratio is realized.

The embodiment illustrates an example in which the first sun gear S31 and the second sun gear S32 are rotatable elements that are rotatable, the first ring gear R31 and the second ring gear R32 are fixed elements that are stationary, and the first thrust force SF1 generated in the first sun gear S31 and the second thrust force SF2 generated in the second sun gear S32 act in directions facing each other and cause at least a part of the forces to cancel each other out. However, the configuration is not limited to this. For example, the configuration may be such that the first ring gear R31 and the second ring gear R32 are rotatable elements that are rotatable, the first sun gear S31 and the second sun gear S32 are fixed elements that are stationary, and the first ring gear R31 and the second ring gear R32 are supported by a thrust bearing in the axial direction L. In such a case, it is preferable that the helix angles of the helical teeth be set so that the first thrust force SF1 that is generated in the first ring gear R31 and the second thrust force SF2 that is generated in the second ring gear R32 act in directions that face each other. Also in this case, it is possible to decrease the thrust force of the entire speed reduction device 3 by causing at least a part of the forces to cancel each other out. In this case, the first thrust force SF1 generated in the first sun gear S31 and the second thrust force SF2 generated in the second sun gear S32 act in mutually separating directions.

Other Embodiments

Hereinafter, other embodiments will be described. The configuration of each embodiment described below may not only be used by itself, but also be combined with any of the configurations of the other embodiments unless inconsistency arises.

Figure 6:
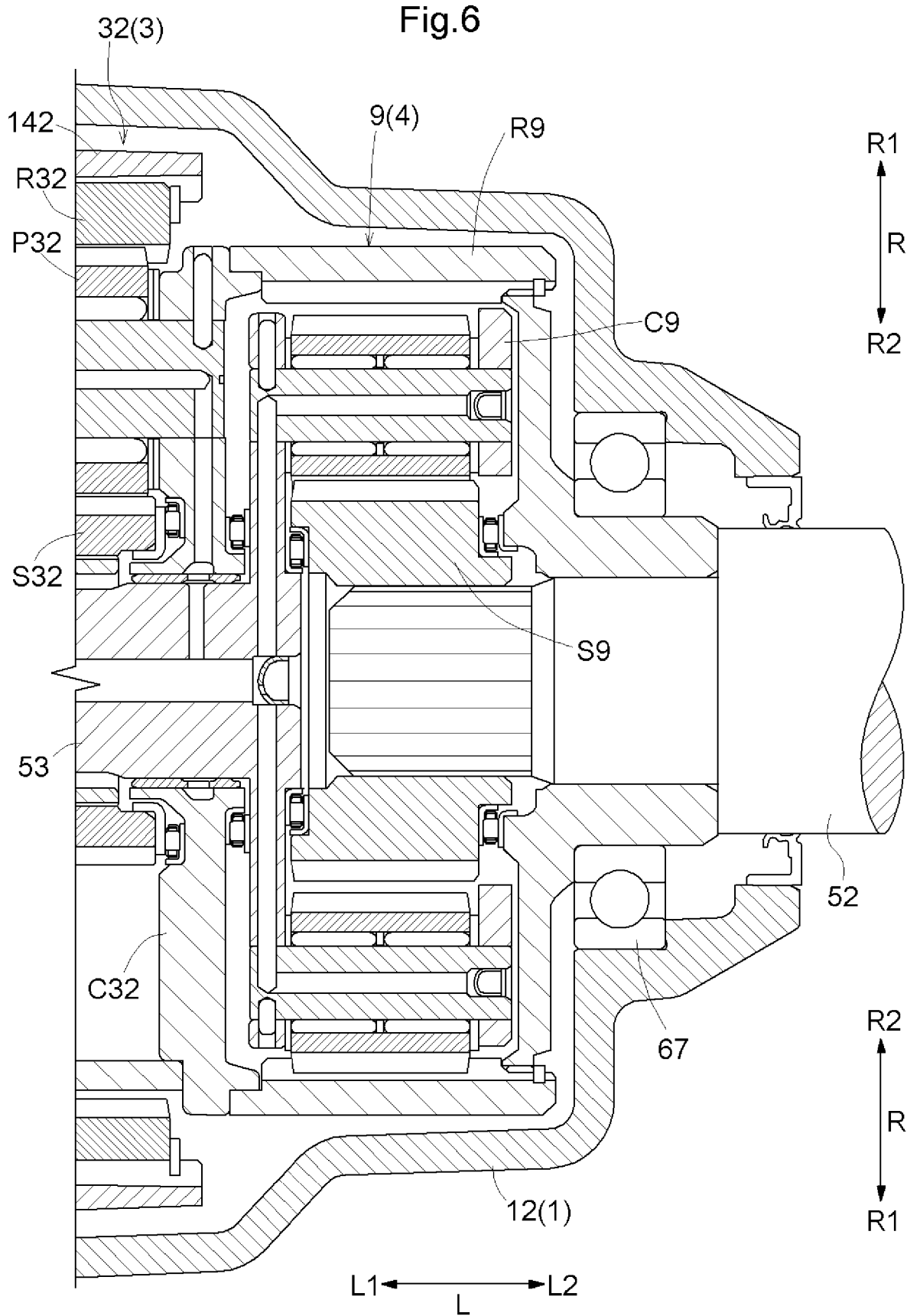
FIG. 6 is an axial sectional view of an example of a differential mechanism device of a planetary gear mechanism.

(1) An example of the bevel gear type differential gear device 4 is described above. However, the differential gear device 4 is not limited to a bevel gear type, and may be a planetary gear type as of a third planetary gear mechanism 9 illustrated in FIG. 6. As illustrated in FIG. 6, the third planetary gear mechanism 9 is a double-pinion type planetary gear mechanism and has a third sun gear S9, a third carrier C9, and a third ring gear R9. The third ring gear R9 is an input element of the third planetary gear mechanism 9, and is coupled to the second carrier C32 of the second planetary gear mechanism 32 so as to rotate integrally. The third sun gear S9 and the third carrier C9 are distribution output elements of the third planetary gear mechanism 9. Here, the third carrier C9 is coupled to the distribution output shaft 53 and a coupling portion (spline) for coupling the second drive shaft 52 is formed on the third sun gear S9.

(2) An example of a configuration is described in which the differential case D4 of the differential gear device 4 is formed integrally with the second carrier C32 of the second planetary gear mechanism 32. However, the configuration is not limited to this, and the configuration may be such that the differential case D4, the second carrier, and C32 can be separated from each other (for example, the differential case D4 and the second carrier C32 are coupled to each other with a bolt or a spline etc.).

(3) An example of a configuration is described in which the second gear width W2 is smaller than the length obtained by multiplying the first gear width W1 by the first speed reduction ratio. However, the configuration is not limited to this, and the second gear width W2 may be set to be the same as or larger than the length obtained by multiplying the first gear width W1 by the first speed reduction ratio.

(4) The configuration in which the second sun gear radius $\varphi 2$ is smaller than the first sun gear radius $\varphi 1$ (see FIGS. 1 and 3) and the configuration in which the second sun gear radius $\varphi 2$ is larger than the first sun gear radius $\varphi 1$ (see FIG. 5) are illustrated above. However, the configuration is not limited to these, and the second sun gear radius $\varphi 2$ may be the same as the first sun gear radius $\varphi 1$. Based on such a configuration, the configuration in which the first speed reduction ratio is smaller than the second speed reduction ratio and the configuration in which the first speed reduction ratio is larger than the second speed reduction ratio are illustrated above. However, the configuration is not limited to these, and the first speed reduction ratio and the second speed reduction ratio may be the same.

(5) An example of an embodiment is indicated in which the speed reduction device 3 is disposed between the rotary electric machine 2 and the differential gear device 4 in the axial direction L. However, the speed reduction device 3 does not have to be disposed between the rotary electric machine 2 and the differential gear device 4 in the axial direction L, if the speed reduction device 3 and the differential gear device 4 are disposed coaxially with the rotary electric machine 2 and a configuration is satisfied in which the driving force that is transmitted via the speed reduction device 3 from the rotary electric machine 2 is distributed to the two wheels (501, 502) by the differential gear device 4.

Summary of Embodiments

Hereinafter, a summary of the vehicle driving device (100) described above will be described simply.

In one aspect, the vehicle driving device (100) includes:
a rotary electric machine (2) that is a driving force source of a first wheel (501) and a second wheel (502);
a speed reduction device (3) that reduces a speed of a rotation of the rotary electric machine (2); and
a differential gear device (4) that distributes to the first wheel (501) and the second wheel (502), a driving force that is transmitted from the rotary electric machine (2) via the speed reduction device (3), in which
the speed reduction device (3) and the differential gear device (4) are disposed coaxially with the rotary electric machine (2),
the speed reduction device (3) has a first planetary gear mechanism (31) and a second planetary gear mechanism (32), the first planetary gear mechanism (31) is disposed on the rotary electric machine (2) side relative to the second planetary gear mechanism (32) in an order of a power transmission path, and the first planetary gear mechanism (31) is disposed on the rotary electric machine (2) side relative to the second planetary gear mechanism (32) along an axial direction (L),
a helix angle of a helical tooth of the first planetary gear mechanism (31) and a helix angle of a helical tooth of the second planetary gear mechanism (32) are formed so that a thrust force (SF1) of the first planetary gear mechanism (31) and a thrust force (SF2) of the second planetary gear mechanism (32) are in mutually opposite directions in the axial direction (L), and
a helix angle (θ1) of a helical tooth of the first planetary gear mechanism (31) is larger than a helix angle (θ2) of a helical tooth of the second planetary gear mechanism (32).

In this configuration, the speed reduction device (3) and the differential gear device (4) are disposed coaxially with the rotary electric machine (2). Thus, compared to when the three devices (3, 4, 5) are disposed separately on three axes parallel to each other, it is possible to suppress a size of the vehicle driving device (100) in a radial direction (R) to be small. Moreover, in this configuration, it is possible to decrease the size of the thrust bearings (71, 73) as described below. Thus, it is possible to suppress the size of the vehicle driving device (100) from being large in the axial direction (L) while disposing the three devices (3, 4, 5) on the same axis.

Due to its structure, the helical gear generates a thrust force that is parallel to the rotational axis. When the directions of the thrust forces (SF1, SF2) generated by the first planetary gear mechanism (31) and the second planetary gear mechanism (32), which are both configured using a helical gear, are in mutually opposite directions, it is possible to cause the thrust forces (SF1, SF2) to cancel each other out. Typically, a thrust bearing is provided adjacent to the helical gear in the axial direction (L) in order to receive a load by the thrust force from the helical gear in the axial direction (L). When the generated thrust force is large, the load applied to the thrust bearing becomes large, thus affecting the durability of the speed reduction device (3) and the vehicle driving device (100). If the size of the thrust bearing is increased, downsizing of the vehicle driving device (100) is hindered. With the configuration, it is possible to decrease the load applied to the thrust bearings (71, 73) by causing a part of the thrust forces of the two planetary gear mechanisms (31, 32) to cancel each other out.

The size of the thrust force is correlated to the transmission torque and the larger the transmission torque is, the larger the thrust force becomes. The second planetary gear mechanism (32) is disposed on an output side of the speed reduction device (3) relative to the first planetary gear mechanism (31) in the order of the power transmission path. The driving force of the rotary electric machine (2) after the speed thereof is reduced in the first planetary gear mechanism (31), is transmitted to the second planetary gear mechanism (32). Thus, the transmission torque is larger in the second planetary gear mechanism (32) compared to the first planetary gear mechanism (31). The thrust force (SF2) of the second planetary gear mechanism (32) is therefore larger than the thrust force (SF1) of the first planetary gear mechanism (31). The size of the thrust force is correlated to the helix angle of the helical tooth of the helical gear, and the larger the helix angle is, the larger the thrust force becomes. If a first helix angle (θ1) that is a helix angle of the helical tooth of the first planetary gear mechanism (31) is larger than a second helix angle (θ2) that is a helix angle of the helical tooth of the second planetary gear mechanism (32), the proportion of the thrust force among forces output from the gear mechanism is larger in the first planetary gear mechanism (31) than in the second planetary gear mechanism (32). That is, with the present configuration, it is possible to decrease the difference in the thrust force resulting from the difference in the transmission torque, with the helix angle of the helical tooth. This means that it is possible to decrease the load applied to the thrust bearings (71, 73) by causing the thrust forces of the two planetary gear mechanisms (31, 32) to cancel each other out. In addition, the size of the thrust bearings (71, 73) can be reduced so that the length of the vehicle driving device (100) in the axial direction (L) can be suppressed to be short.

In this way, with the configuration, it is possible to decrease the size of the entire vehicle driving device (100) in both the radial direction (R) and the axial direction (L).

Here, it is preferable that the thrust forces (SF1, SF2) of the first planetary gear mechanism (31) and the second planetary gear mechanism (32), the thrust forces (SF1, SF2) facing each other, be transmitted via a transmitting member (72) disposed between the first planetary gear mechanism (31) and the second planetary gear mechanism (32) in the axial direction (L).

With such a configuration, when the direction of the thrust force (SF1) generated by the first planetary gear mechanism (31) and the direction of the thrust force (SF2) generated by the second planetary gear mechanism (32) face each other, the thrust forces are transmitted via the transmitting member (72). Thus, it is possible appropriately compose the vectors of the thrust forces (SF1, SF2) in mutually opposite directions that are generated by the planetary gear mechanisms (31, 32) and cause a part of the thrust forces (SF1, SF2) to cancel each other out.

It is preferable that the helix angle of the helical tooth of the first planetary gear mechanism (31) and the helix angle of the helical tooth of the second planetary gear mechanism (32) be formed so that the thrust forces (SF2) transmitted via the transmitting member (72) face each other in the axial direction (L) when a driving force in a forward direction of the rotary electric machine (2) is transmitted to the first wheel (501) and the second wheel (502).

The directions of the thrust forces differ depending on the directions of the driving forces that are transmitted to each of the planetary gear mechanisms (31, 32). As described above, when the thrust forces (SF1, SF2) that are transmitted via the transmitting member (72) face each other in the axial direction (L), the thrust forces (SF1, SF2) act in directions moving away from the thrust bearings (71, 73) that are disposed on both end portions in the axial direction (L). As a result, the load applied to the thrust bearings (71, 73) that are disposed on both end portions in the axial direction (L) can be reduced. In most cases, the direction that the wheels (501, 502) are driven is forward rather than rearward. Thus, for reducing the load applied to the thrust bearings (71, 73) disposed on both sides in the axial direction (L), when the driving force in the forward direction of the first wheel (501) and the second wheel (502) is transmitted, it is preferable that the thrust forces (SF1, SF2) face each other in the axial direction (L).

It is preferable that: the first planetary gear mechanism (31) and the second planetary gear mechanism (32) each have a sun gear (S31, S32), a carrier (C31, C32), and a ring gear (R31, R42); in both the first planetary gear mechanism (31) and the second planetary gear mechanism (32), one of the sun gear (S31, S32) and the ring gear (R31, R32) be a rotatable element that is configured to rotate and the other be a fixed element that is stationary; and helix angles of helical teeth of the rotatable elements be formed so as to be in mutually opposite directions in the axial direction (L).

With such a configuration, the helix angles of the helical teeth of the rotary elements (input elements) of the two planetary gear mechanisms (31, 32) in the axial direction (L), the rotary elements being adjacent to each other, are formed so as to be in mutually opposite directions. Thus, it is possible to cause a part of the thrust forces (SF1, SF2) that are generated in the planetary gear mechanisms (31, 32) to appropriately cancel each other out.

It is preferable that: the first planetary gear mechanism (31) have a first sun gear (S31) that is drivingly coupled to the rotary electric machine (2), a first carrier (C31), and a first ring gear (R31) that is coupled to a fixing member (141) so that the first ring gear (R31) is stationary; the second planetary gear mechanism (32) have a second sun gear (S32) that is drivingly coupled to the first carrier (C31), a second carrier (C32), and a second ring gear (R32) that is coupled to a fixing member (142) so that the second ring gear (R32) is stationary; and a helix angle of a helical tooth of the first sun gear (S31) and a helix angle of a helical tooth of the second sun gear (S32) be formed so as to be in mutually opposite directions in the axial direction (L).

With such a configuration, the helix angles of the helical teeth of the sun gears (S31, S32) of the two planetary gear mechanisms (31, 32), the sun gears (S31, S32) being adjacent in the axial direction (L), are formed so as to be in mutually opposite directions. Thus, it is possible to cause a part of the thrust forces (SF1, SF2) that are generated in the planetary gear mechanisms (31, 32) to appropriately cancel each other out.

It is also preferable that a thrust bearing (72) be disposed between the first sun gear (S31) and the second sun gear (S32) in the axial direction (L).

With such a configuration, the thrust force (SF1) generated by the first sun gear (S31) of the first planetary gear mechanism (31) and the thrust force (SF2) generated by the second sun gear (S32) of the second planetary gear mechanism (32) are transmitted via the thrust bearing (72). Thus, it is possible appropriately compose the vectors of the thrust forces (SF1, SF2) in mutually opposite directions that are generated by the first sun gear (S31) and the second sun gear (S32) and cause a part of the thrust forces (SF1, SF2) to cancel each other out.

It is preferable that: a case (1) housing the rotary electric machine (2), the speed reduction device (3), and the differential gear device (4) be further provided; the case (1) have a target portion (14*c*) disposed on an opposite side of the first planetary gear mechanism (31) from a side on which the second planetary gear mechanism (32) is disposed in the axial direction (L); the first planetary gear mechanism (31) have a first sun gear (S31) drivingly coupled to the rotary electric machine (2); and a thrust bearing (71) be disposed between the first sun gear (S31) and the target portion (14*c*) in the axial direction (L).

With such a configuration, it is possible to restrict, with the thrust bearing (71), the first sun gear (S31) from moving away from the second planetary gear mechanism (32) in the axial direction (L). As described above, since it is possible to cause a part of the thrust forces (SF1, SF2) of the two planetary gear mechanisms (31, 32) to cancel each other out, it is possible to decrease the load applied to the thrust bearing (71) and decrease the size of the thrust bearing (71).

It is preferable that the speed reduction device (3) be disposed between the rotary electric machine (2) and the differential gear device (4) in the axial direction (L).

With such a configuration, it is possible to configure the vehicle driving device (100) that is simple, and downsizing of the vehicle driving device (100) is realized.

Here, it is preferable that a first gear width (W1) that is a width of a gear of the first planetary gear mechanism (31) along the axial direction (L) be smaller than a second gear width (W2) that is a width of a gear of the second planetary gear mechanism (32) along the axial direction (L).

As described above, the transmission torque is larger in the second planetary gear mechanism (32) compared to the first planetary gear mechanism (31). From the view point of mechanical strength, it is preferable that the larger the transmission torque be, the larger the width of the gear along the axial direction (L) be set. It is possible to configure the appropriate speed reduction device (3) having a structure compatible with the size of the torque by decreasing the first gear width (W1) of the first planetary gear mechanism (31) with a relatively small transmission torque, compared to the second gear width (W2) of the second planetary gear mechanism (32) with a relatively large transmission torque. Thus, it is possible to suppress the length of the speed reduction device (3) in the axial direction (L) to be small.

As described above, when the first gear width (W1) that is the width of the gear of the first planetary gear mechanism (31) along the axial direction (L) is smaller than the second gear width (W2) that is the width of the gear of the second planetary gear mechanism (32) along the axial direction (L), it is preferable that the second gear width (W2) be smaller than a length obtained by multiplying the first gear width (W1) by the first speed reduction ratio.

When the ratio of the first gear width (W1) and the second gear width (W2) are made proportional to the input torques respectively, the second gear width (W2) is the length obtained by multiplying the first gear width (W1) by the first speed reduction ratio. Although the transmission torque of the second planetary gear mechanism (32) is larger than that of the first planetary gear mechanism (31), the rotational speed of the second planetary gear mechanism (32) is lower than that of the first planetary gear mechanism (31). Thus, it is possible to ensure a necessary durability even if the second gear width (W2) is smaller than the length obtained by multiplying the first gear width (W1) by the first speed reduction ratio. Since the second gear width (W2) is smaller than the length obtained by multiplying the first gear width (W1) by the first speed reduction ratio, it is possible to shorten the length of the second planetary gear mechanism (32) in the axial direction (L), and thus it is possible to shorten the length of the entire speed reduction device (3) in the axial direction (L).

The invention claimed is:

1. A vehicle driving device comprising:
a rotary electric machine that is a driving force source of a first wheel and a second wheel;
a speed reduction device that reduces a speed of a rotation of the rotary electric machine; and
a differential gear device that distributes to the first wheel and the second wheel, a driving force that is transmitted from the rotary electric machine via the speed reduction device, wherein
the speed reduction device and the differential gear device are disposed coaxially with the rotary electric machine,
the speed reduction device has a first planetary gear mechanism and a second planetary gear mechanism, the first planetary gear mechanism is disposed on a rotary electric machine side relative to the second planetary gear mechanism in an order of a power transmission path, and the first planetary gear mechanism is disposed on the rotary electric machine side relative to the second planetary gear mechanism along an axial direction,
a helix angle of a helical tooth of the first planetary gear mechanism and a helix angle of a helical tooth of the second planetary gear mechanism are formed so that a thrust force of the first planetary gear mechanism and a thrust force of the second planetary gear mechanism are in mutually opposite directions in the axial direction, and
the helix angle of the helical tooth of the first planetary gear mechanism is larger than the helix angle of the helical tooth of the second planetary gear mechanism.

2. The vehicle driving device according to claim 1, wherein thrust forces of the first planetary gear mechanism and the second planetary gear mechanism, the thrust forces facing each other, are transmitted via a transmitting member disposed between the first planetary gear mechanism and the second planetary gear mechanism in the axial direction.

3. The vehicle driving device according to claim 2, wherein the helix angle of the helical tooth of the first planetary gear mechanism and the helix angle of the helical tooth of the second planetary gear mechanism are formed so that the thrust forces that are transmitted via the transmitting member face each other in the axial direction when a driving force in a forward direction of the rotary electric machine is transmitted to the first wheel and the second wheel.

4. The vehicle driving device according to claim 3, wherein
the first planetary gear mechanism and the second planetary gear mechanism each have a sun gear, a carrier, and a ring gear, and
in both the first planetary gear mechanism and the second planetary gear mechanism, one of the sun gear and the ring gear is a rotatable element that is configured to rotate and the other is a fixed element that is stationary, and helix angles of helical teeth of the rotatable elements are formed so as to be in mutually opposite directions in the axial direction.

5. The vehicle driving device according to claim 4, wherein
the first planetary gear mechanism has a first sun gear that is drivingly coupled to the rotary electric machine, a first carrier, and a first ring gear that is coupled to a fixing member so that the first ring gear is stationary,
the second planetary gear mechanism has a second sun gear that is drivingly coupled to the first carrier, a second carrier, and a second ring gear that is coupled to a fixing member so that the second ring gear is stationary, and
a helix angle of a helical tooth of the first sun gear and a helix angle of a helical tooth of the second sun gear are formed so as to be in mutually opposite directions in the axial direction.

6. The vehicle driving device according to claim 5, wherein a thrust bearing is disposed between the first sun gear and the second sun gear in the axial direction.

7. The vehicle driving device according to claim 6, further comprising a case that houses the rotary electric machine, the speed reduction device, and the differential gear device, wherein
the case has a target disposed on an opposite side of the first planetary gear mechanism from a side on which the second planetary gear mechanism is disposed in the axial direction,
the first planetary gear mechanism has a first sun gear that is drivingly coupled to the rotary electric machine, and
a thrust bearing is disposed between the first sun gear and the target in the axial direction.

8. The vehicle driving device according to claim 7, wherein the speed reduction device is disposed between the rotary electric machine and the differential gear device in the axial direction.

9. The vehicle driving device according to claim 8, wherein a first gear width that is a width of a gear of the first planetary gear mechanism along the axial direction is smaller than a second gear width that is a width of a gear of the second planetary gear mechanism along the axial direction.

10. The vehicle driving device according to claim 9, wherein the second gear width is smaller than a length obtained by multiplying the first gear width by a speed reduction ratio of the first planetary gear mechanism.

11. The vehicle driving device according to claim 2, wherein
the first planetary gear mechanism and the second planetary gear mechanism each have a sun gear, a carrier, and a ring gear, and
in both the first planetary gear mechanism and the second planetary gear mechanism, one of the sun gear and the ring gear is a rotatable element that is configured to rotate and the other is a fixed element that is stationary, and helix angles of helical teeth of the rotatable elements are formed so as to be in mutually opposite directions in the axial direction.

12. The vehicle driving device according to claim 2, wherein
the first planetary gear mechanism has a first sun gear that is drivingly coupled to the rotary electric machine, a first carrier, and a first ring gear that is coupled to a fixing member so that the first ring gear is stationary,
the second planetary gear mechanism has a second sun gear that is drivingly coupled to the first carrier, a second carrier, and a second ring gear that is coupled to a fixing member so that the second ring gear is stationary, and a helix angle of a helical tooth of the first sun gear and a helix angle of a helical tooth of the second sun gear are formed so as to be in mutually opposite directions in the axial direction.

13. The vehicle driving device according to claim 2, further comprising a case that houses the rotary electric machine, the speed reduction device, and the differential gear device, wherein the case has a target disposed on an opposite side of the first planetary gear mechanism from a side on which the second planetary gear mechanism is disposed in the axial direction, the first planetary gear mechanism has a first sun gear that is drivingly coupled to the rotary electric machine, and a thrust bearing is disposed between the first sun gear and the target in the axial direction.

14. The vehicle driving device according to claim 1, wherein the first planetary gear mechanism and the second planetary gear mechanism each have a sun gear, a carrier, and a ring gear, and in both the first planetary gear mechanism and the second planetary gear mechanism, one of the sun gear and the ring gear is a rotatable element that is configured to rotate and the other is a fixed element that is stationary, and helix angles of helical teeth of the rotatable elements are formed so as to be in mutually opposite directions in the axial direction.

15. The vehicle driving device according to claim 1, wherein the first planetary gear mechanism has a first sun gear that is drivingly coupled to the rotary electric machine, a first carrier, and a first ring gear that is coupled to a fixing member so that the first ring gear is stationary, the second planetary gear mechanism has a second sun gear that is drivingly coupled to the first carrier, a second carrier, and a second ring gear that is coupled to a fixing member so that the second ring gear is stationary, and a helix angle of a helical tooth of the first sun gear and a helix angle of a helical tooth of the second sun gear are formed so as to be in mutually opposite directions in the axial direction.

16. The vehicle driving device according to claim 15, wherein a thrust bearing is disposed between the first sun gear and the second sun gear in the axial direction.

17. The vehicle driving device according to claim 1, further comprising a case that houses the rotary electric machine, the speed reduction device, and the differential gear device, wherein the case has a target disposed on an opposite side of the first planetary gear mechanism from a side on which the second planetary gear mechanism is disposed in the axial direction, the first planetary gear mechanism has a first sun gear that is drivingly coupled to the rotary electric machine, and a thrust bearing is disposed between the first sun gear and the target in the axial direction.

18. The vehicle driving device according to claim 1, wherein the speed reduction device is disposed between the rotary electric machine and the differential gear device in the axial direction.

19. The vehicle driving device according to claim 1, wherein a first gear width that is a width of a gear of the first planetary gear mechanism along the axial direction is smaller than a second gear width that is a width of a gear of the second planetary gear mechanism along the axial direction.

20. The vehicle driving device according to claim 19, wherein the second gear width is smaller than a length obtained by multiplying the first gear width by a speed reduction ratio of the first planetary gear mechanism.

* * * * *